(12) United States Patent
Asbury

(10) Patent No.: US 6,494,165 B2
(45) Date of Patent: Dec. 17, 2002

(54) ANIMAL LITTER BOX

(76) Inventor: Russell Asbury, 638 E. Clay St., Whitewater, WI (US) 53190

( * ) Notice: Subject to any disclaimer, the term of this patent is extended or adjusted under 35 U.S.C. 154(b) by 0 days.

(21) Appl. No.: 09/854,971

(22) Filed: May 14, 2001

(65) Prior Publication Data
US 2002/0166510 A1 Nov. 14, 2002

(51) Int. Cl.$^7$ .................................................. A01K 1/01
(52) U.S. Cl. ...................................... 119/166; 119/165
(58) Field of Search .............................. 119/161, 163, 119/165, 166, 168, 167, 169

(56) References Cited

U.S. PATENT DOCUMENTS

| 5,167,204 A | 12/1992 | Nussle |
| 5,178,099 A | 1/1993 | Lapps et al. |
| 5,259,340 A * | 11/1993 | Arbogast ..................... 119/165 |
| 5,272,999 A | 12/1993 | Nussle |
| 5,507,252 A | 4/1996 | Ebert |
| 5,531,186 A * | 7/1996 | Flood et al. ................ 119/166 |
| 5,544,620 A * | 8/1996 | Sarkissian .................... 119/166 |
| 5,579,721 A * | 12/1996 | O'Toole ....................... 119/166 |
| 5,601,052 A * | 2/1997 | Rood et al. .................. 119/166 |
| 5,673,648 A | 10/1997 | Ayle |
| 5,678,508 A * | 10/1997 | Butzen ........................ 119/166 |
| 5,823,137 A * | 10/1998 | Rood et al. .................. 119/166 |
| 6,039,003 A * | 3/2000 | Cox ............................. 119/166 |
| 6,202,595 B1 * | 3/2001 | Atcravi ........................ 119/165 |

* cited by examiner

Primary Examiner—Charles T. Jordan
Assistant Examiner—Judith A. Nelson
(74) Attorney, Agent, or Firm—Joseph S. Heino

(57) ABSTRACT

A main litter box base is covered pith a partial litter box canopy. Dividing the main litter box container into two different compartments is a sift screen, the sift screen being sealed about its edges with the main litter box container and further being sealed about the edge of the litter box canopy. The litter box screen includes a moveable door for accessing or preventing access to the screened portion of the box. A stop member is provided opposite the access door for preventing the movement of loose excrement and clumped animal litter from atop the sifting screen. A removable or detachable scoop or shovel is mounted to the outer surface of the main litter box base.

15 Claims, 2 Drawing Sheets

ANIMAL LITTER BOX

FIELD OF THE INVENTION

This invention relates generally to products and devices used by the owners of animals and pets. More particularly, it relates to an animal litter box which is used to facilitate the removal of animal excrement and clumped litter from a supply of clean litter such that the clean litter can be recycled and reused. It also relates to such a litter box which allows for the recycling and reuse of clean litter without the need to remove the clean litter from the box.

BACKGROUND OF THE INVENTION

Animals and pets hold a special place in the heart of humanity. Indeed, pets can provide their owners with the most joyous and rewarding of life experiences. Pets can, however, also place many demands upon their owners due in large part to their near constant reliance upon their owners for the pet's most basic needs. This includes feeding them, seeing to it that they get enough exercise, and cleaning up after them. In the case of our feline companions, as well as some other domesticated house animals, this often requires the attention of the owner to the continuous upkeep and maintenance of an indoor animal litter box.

In the experience of this inventor, there are many animal and pet devices which have been disclosed for assisting pet or animal owners with the cleaning of an animal litter box whereby animal excrement and clumped animal litter are separated from a supply of litter and then physically removed from the device. In his own personal search of the marketplace, however, very few of such devices are, in the experience of this inventor, commercially available for use by members of the purchasing and consuming public. This may seem to be odd given the extent of the current pet population and the concomitant need for, and the desirability of, such devices. In the view of this inventor, however, the reason for this is fairly simple. Most devices which have been disclosed appear to be too complex, requiring many different parts for the manufacturer to fabricate and assemble and requiring many different steps in order that the pet owner can properly utilize the devices.

As an additional observation made by this inventor, the originators of many such litter boxes profess to effectively eliminate the need to scrape or scoop clumped litter from the bottom or side surfaces of the principal or main litter box container. Anyone who is even remotely familiar with animal litter boxes is readily aware of the fact that commercially available litter, in most cases, effectively "glues" itself to any available surface thereby making it extremely difficult to remove without some sort of scoop or shovel action by the pet owner. This is particularly true where, for example, the pet has a habit of urinating in one particular spot or corner of the litter box.

SUMMARY OF THE INVENTION

Accordingly, it is an object of the present invention to provide a new, useful and uncomplicated animal litter box which can be easily manufactured and which can be made with a minimal number of parts. It is a further object of the present invention to provide such an animal litter box which can be operated in a very simple fashion without excessive manipulation of the litter box itself and without requiring an excessive number of steps to use. It is yet another object of the present invention to provide such an animal litter box which catches and separates sifted animal excrement and clumped animal litter from clean litter. It is still another object of the present invention to provide such an animal litter box which allows for the efficient removal of animal excrement and clumped animal litter from the litter box while also allowing for the easy redistribution of litter for additional use within the litter box.

The present invention has obtained these objects. The present invention provides for a main litter box base. A portion of the main litter box base is covered with a partial litter box canopy. Dividing the main litter box container into two different compartments is a sift screen, the sift screen being sealed about its edges with the main litter box container and further being sealed about the edge of the litter box canopy. In an alternative embodiment, the sift screen is engageable with the main litter box container and the litter box canopy but is also removable from the assembly for cleaning access behind the screen. The litter box screen includes a moveable door for accessing or preventing access to the screened portion of the box. A screen holding bar is provided opposite the access door for preventing the movement of loose excrement and clumped animal litter from atop the sifting screen. A detachable shovel or scoop may be provided to assist the user with the removal of material which is deposited atop the sifting screen or which is attached to the inner surfaces of the main litter box base. The foregoing and other features of the device of the present invention will be further apparent from the detailed description which follows.

DETAILED DESCRIPTION

Figure 1:
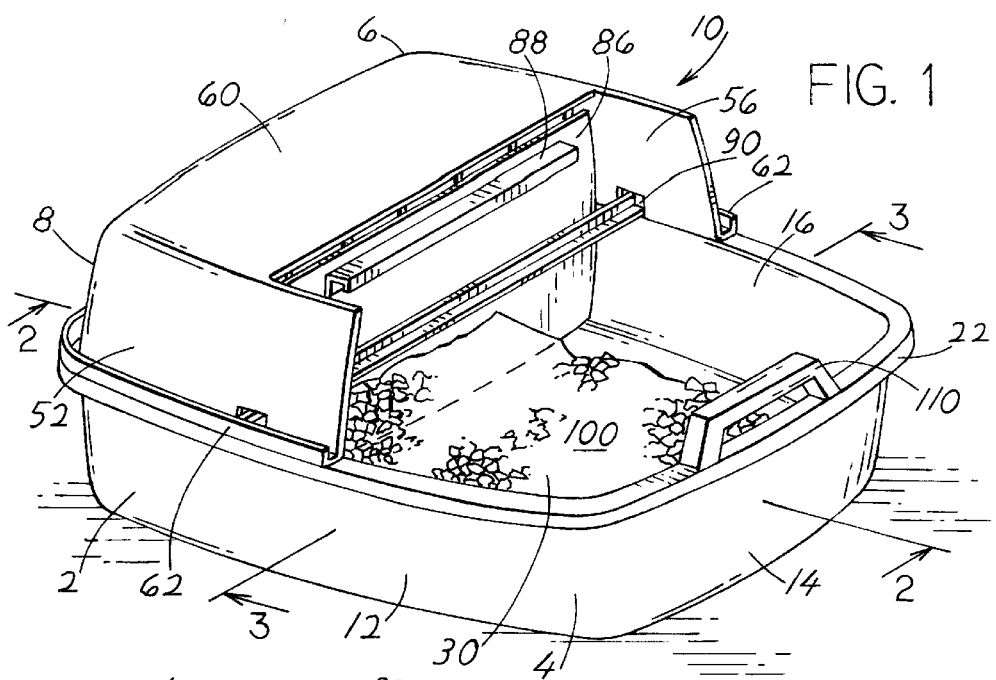
FIG. 1 is a left side, front and top perspective view of an animal litter box constructed in accordance with the present invention.

Referring now to the drawings in detail wherein like numbered numerals refer to like elements throughout, FIG. 1 illustrates an embodiment of the animal litter box of the present invention and is generally identified 10. The animal litter box 10 includes a main base member 2 having a first sidewall 12, a second sidewall 14, a third sidewall 16 and a fourth sidewall 18, each of said sidewalls 12, 14, 16, 18 being situated in a generally vertical plane and forming a continuous sidewall surface 4. The continuous sidewall surface 4 is integrally formed with a bottom surface 20. The continuous sidewall surface 4 and the integral bottom surface 20 enclose and define a base member cavity 30. The cavity 30 includes a forward cavity portion 32 and a rearward cavity portion 34. In this fashion, the unitary design of the main base member 2 allows for complete and sanitary containment of the animal litter 100 placed within it. It also allows for the containment of animal urine and excrement within the main base member 2 and the main base member cavity 30 as the animal utilizes the litter box 10. In the preferred embodiment, the main base member 10 includes a continuous lip or edge 22 which encircles the main base member cavity 30 at the upper edges of the continuous sidewall 4. It is also possible that the litter box 10 can be formed from any number of plastic or acrylic materials, the precise composition not being a limitation of this invention. In the preferred embodiment, the main base member 2 is formed of a single piece of plastic-like material. In this fashion, cleaning of the main base member 2 is simplified in that a smooth inner surface is provided which resists clumped litter adhesion. Such fabrication also minimizes the likelihood of odor retention within the device 10.

Figure 5:
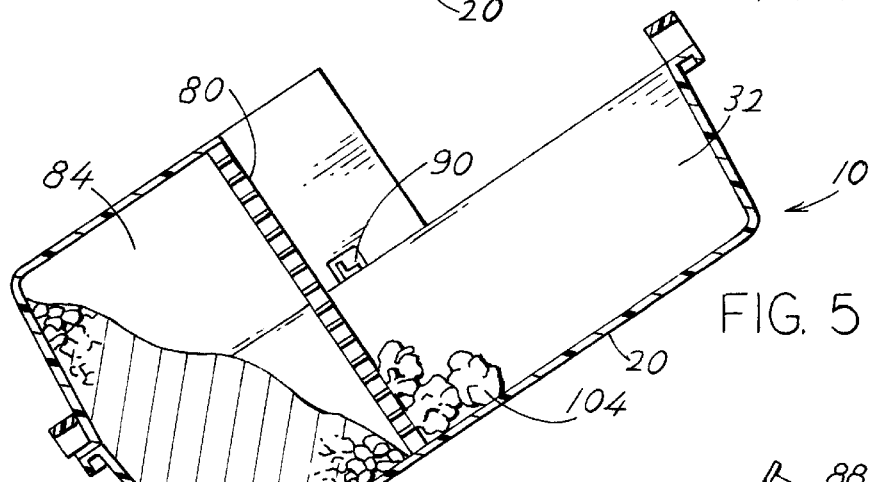
FIG. 5 is still another view of the litter box as shown in FIG. 2 and showing the box tilted rearwardly with loose litter falling into the rearward compartment.

Covering a portion of the main base member 2 is a complementary canopy member 6. In the preferred embodiment of the device 10 of the present invention, the canopy member 6 which covers the main base member 2 is configured in a mirror-image fashion. That is, the shape of the main base member 2, when inverted, closely resembles the shape of the canopy member 6, although the canopy member 6 is a somewhat incomplete structure when compared to the main base member 2. The canopy member 6 includes a first sidewall 52, a second sidewall 56 and a third sidewall 58, each of said canopy sidewalls 52, 56, 58 being situated in a generally vertical plane and forming a continuous canopy sidewall surface 8. The continuous canopy sidewall surface 8 is integrally formed with a top surface 60. The continuous canopy sidewall surface 8 and the integral top surface 60 enclose and define a canopy member cavity 84. In the preferred embodiment, the canopy member 6 includes a continuous lip or edge 62 which encircles the lowermost portion of the canopy member cavity 30 at the lower edges of the continuous sidewall surface 8. In this fashion, the unitary design of the canopy member 6 allows for complete and sanitary containment of the animal litter 100 when the litter box 10 is tipped rearwardly. See FIG. 5. The purpose of this tipping will be further apparent later in this detailed description. As was true of the main base member 2, it is also possible that the canopy member 6 can be formed from any number of plastic or acrylic materials. In the preferred embodiment, the canopy member 6 is formed of a single piece of plastic-like material. Also in the preferred embodiment, a portion of the edge 22 of the main base member 2 is fused to the edge 62 of the canopy member 6 such that the gap formed between the edges 22, 62 is effectively sealed so as to prevent the leakage of litter 100 through the gap.

Figure 2:
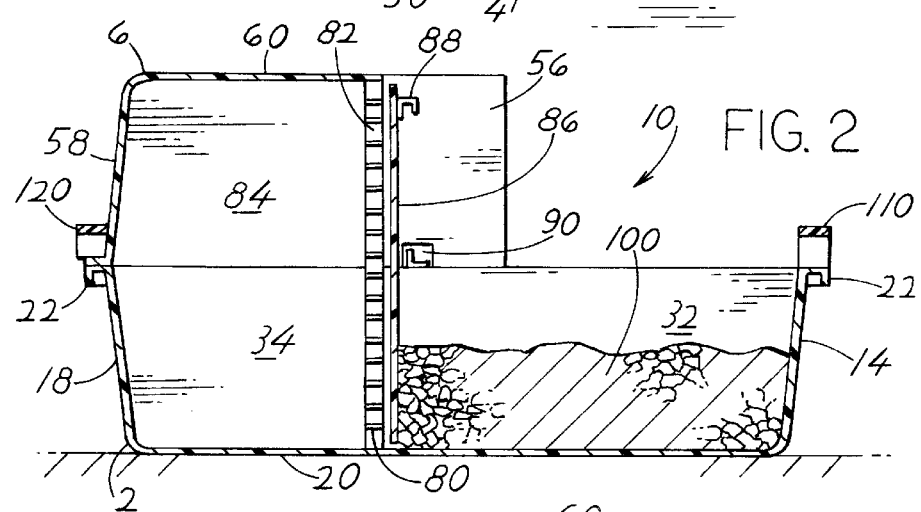
FIG. 2 is a left side elevational and partially sectioned view of the litter box shown in FIG. 1 and taken along line 2—2 thereof.
Figure 3:
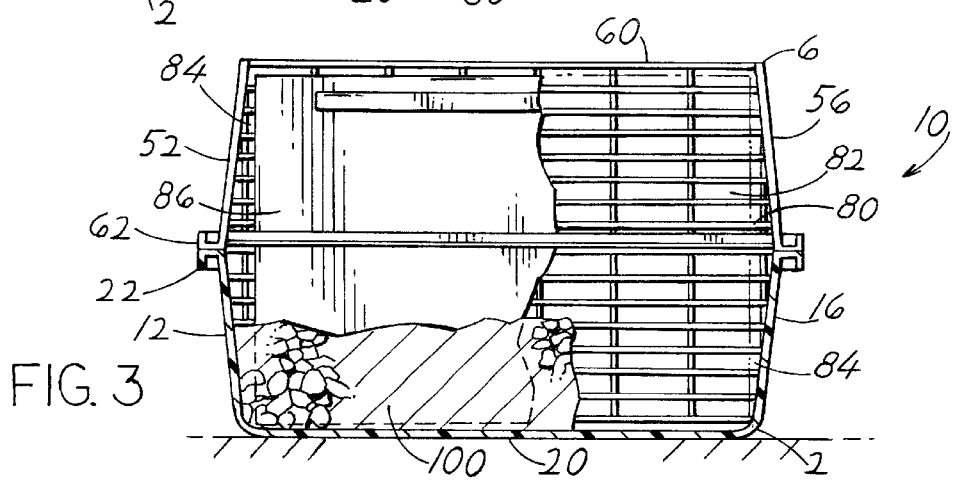
FIG. 3 is a front elevational and partially sectioned view of the litter box shown in FIG. 1 and taken along line 3—3 thereof.

In the preferred embodiment, the canopy member 6 covers the rear cavity portion 34 of the rearward portion of the main base member 2. The edge or lip 22 of the main base member 2, and that part of the canopy edge 52 laying adjacent to it, forms a plane which is substantially horizontal when the litter box 10 is used in its normal position. See FIG. 2. A screen filter 80 is provided which includes a number of openings 82 defined within it. The openings 82 allow the passage of litter 100 through them, but nothing else, including clumped litter and animal excrement 104. The screen filter 80 lies in a plane which is substantially perpendicular to the edges 22, 62 of the main base member 2 and the canopy member 6, respectively. In one embodiment of the device of the present invention, the screen filter 80 is sealed about its edges 84 to the sidewalls 12, 16 and bottom surface 20 of the main base member 2 and about its edges 84 to the sidewalls 52, 56 and top surface 60 of the canopy member 6. It is also possible that the screen filter 80 could be manufactured in such a way that it could clipped or slid into position and locked into place by using a number of other design expediencies without deviating from the spirit of the present invention. Extending forwardly of the screen filter 80 is an extended portion of the first and second sidewalls 52, 56 of the canopy member 6. The purpose and function of the extended sidewall portions 52, 56 is to prevent litter 100 overflow when the litter box 10 is tipped as described above. The canopy also includes a forward handle 110 and a rearward handle 120 for easy grasping and movement of the litter box 10. Although not shown, a removable or detachable scoop or shovel can be mounted to the outer surface of the second sidewall 14 of the main base member 2. This provides ready access to an implement which allows the user to remove debris from atop the screen filter 80 and to scrape debris which is attached to the inner surfaces of the main base member 2 as well.

Figure 4:
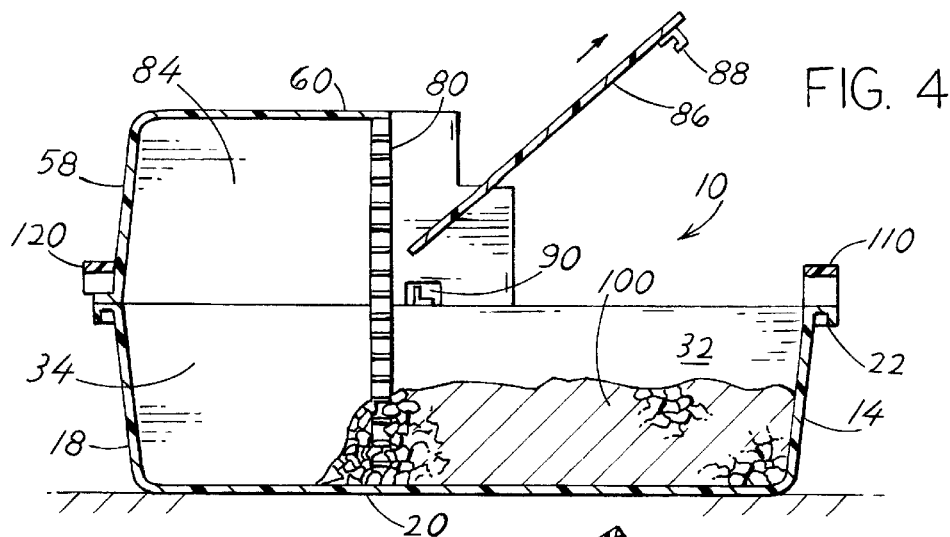
FIG. 4 is another view of the litter box as shown in FIG. 2 and showing an access door to a rearward compartment of the box in its elevated position.
Figure 6:
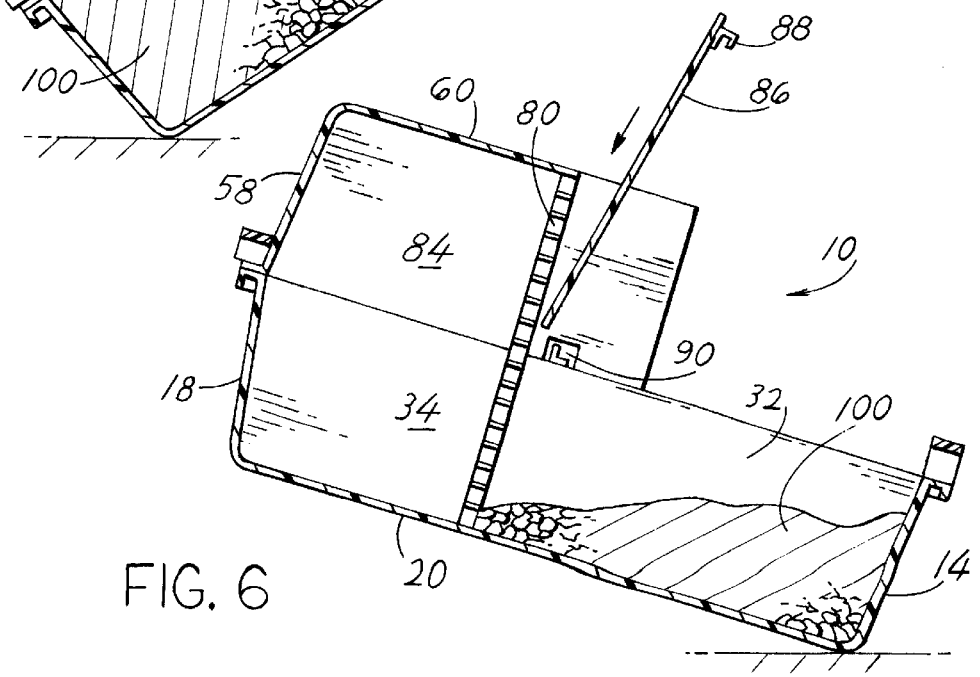
FIG. 6 is yet another view of the litter box as shown in FIG. 2 and showing the box tilted forwardly with loose litter falling from the rearward compartment to a forward compartment and the access door being reinserted.

In the preferred embodiment, a handle 110 is provided at the upper edge 22 of the second sidewall 14 of the main base member 2. A screen cover holding bar 90 is provided which extends perpendicularly from the first sidewall 12 of the main base member 2 to the third sidewall 16 of the main base member 2. The screen cover holding bar 90 lies in a plane which is substantially parallel with the plane formed by main base member and canopy member edges 22, 62. Interposed in sliding relationship between the screen filter 80 and the screen cover holding bar 90 is a screen cover 86. The screen cover 86 includes a screen cover handle 88 which allows the user to grasp the handle 88 and urge the cover 86 upwardly and downwardly. See FIGS. 4 and 6. The screen cover 86 can be locked or secured in position or can be removed altogether when such is desired or required.

In application, the main base member 2 is filled with enough animal litter 100 to allow the pet to utilize the litter box 10 as intended. See FIG. 2. In the preferred embodiment, this is done with the screen cover 86 in its downward or closed position. This prevents any errant urine from penetrating or passing through the screen 80. When, in the pet owner's view, removal of the accumulated excrement or clumped animal litter 104 is desired or required, the screen cover 86 is slid upwardly and perhaps removed altogether. See FIG. 4. The main base member 2 is grasped by its handle 110 and rotated upwardly to a substantially vertical position. See FIG. 5. In this fashion, the generally "L-shaped" litter box 10 is rotated to the point that loose litter 100 passes through the openings 82 defined within the screen 80 and into the rearward cavity portion 34 of the main base member 2 and the cavity portion 84 of the canopy member 6, thus leaving accumulated excrement or clumped animal litter 104 behind. The excrement or clumped litter 104 rests atop the screen 80 and is prevented from movement across the screen 80 by virtue of the screen cover holding bar 90. Loose animal excrement and clumped animal litter 104 will fall on to and remain on that portion of the screen 80 which is located behind the screen cover holding bar 90. Any clumped animal litter 104 which remains attached to the inside bottom surface 20 of the main base member 2 can be conveniently scraped or shoveled away and all clumped animal litter and excrement 104 can be removed from the top surface of the screen 80. The entire animal litter box 10 is then rotated back to its original position. See FIG. 6. In fact, it is desirable to rotate the box 10 even further than that to insure that all loose litter 100 is moved back into the forward cavity portion 32 of the main box member 2. In this fashion, the litter 100 contained within the enclosure 34, 84 which is defined by the canopy member 6, the rearward cavity portion 34 of the main base member 2 and the screen filter 80 enters the inside bottom 32 of the uncovered main base member 2. At that point, the screen cover 86 is then reinserted and/or slid downwardly to effectively cover the screen filter 80. The box 10 is again ready for use by the pet. Depending upon the volume of the animal litter 104 which is removed in clumped fashion, it may be necessary to periodically replenish the supply of animal litter 100 within the forward cavity 32 of the box 10. When it becomes occasionally necessary to clean that part of the box 10 which lies behind the screen filter 80, the screen filter 80 may be removed to provide access to that cavity area 34, 84.

From the foregoing detailed description, it will be apparent that there has been provided a new, useful and uncomplicated animal litter box which can be easily manufactured; which can be made with a minimal number of parts; which can be operated in a very simple fashion without excessive manipulation of the litter box itself and without requiring an excessive number of steps to use; which catches and separates sifted animal excrement and clumped animal litter from clean litter; which allows for the efficient removal of animal excrement and clumped animal litter from the litter box while also allowing for the easy redistribution of litter for additional use within the litter box.

The principles of this invention having been fully explained in connection with the foregoing, I hereby claim as my invention:

1. An animal litter box which comprises
   a main base member, said main base member having a plurality of side walls, a bottom surface, and a generally horizontally oriented cavity defined by said side walls and said bottom surface for retaining a volume of animal litter therewithin,
   a canopy member, said canopy member being functionally adapted to overlay a portion of said main base member and a portion of said base member cavity,
   a vertically oriented screen member, said screen member dividing said main base member cavity into two adjacent cavity areas, said screen member having apertures defined within it that are large enough to permit passage of clean animal litter therethrough when the litter box is tilted and that are small enough to prevent passage of animal excrement and clumped, soiled animal litter therethrough when the litter box is tilted, and
   a screen holding bar extending generally horizontally across the base member cavity immediately adjacent said screen member whereby animal excrement and clumped, soiled animal litter is contained atop said screen member when the litter box is tilted for removal therefrom.

2. The litter box of claim 1 wherein the plurality of sidewalls and the bottom surface of said base member includes a continuous sidewall and bottom surface, said sidewall and bottom surface being integrally formed of a single piece of material.

3. The litter box of claim 2 wherein said canopy member includes a continuous sidewall and a top surface, said sidewall and top surface being integrally formed of a single piece of material.

4. The litter box of claim 3 wherein said main base member and said canopy member are sealingly engaged so as to prevent the passage of animal litter therebetween when the litter box is tilted such that the base member cavity is oriented generally vertically.

5. The litter box of claim 4 wherein a portion of said main base member, said canopy member and said screen member form a second lifter box cavity therewithin when the litter box is tilted such that the base member cavity is oriented generally vertically.

6. The litter box of claim 5 including a screen access door, said screen access door being manually movable between a fully opened and a fully closed position relative to and immediately adjacent the screen member such that sifting of animal litter is prevented when the screen access door is in its fully closed position.

7. The litter box of claim 1 including a shovel member removably attached to said box.

8. An animal litter box which comprises
   a main base member, said main base member having a plurality of base member sidewalls and a bottom portion which define a generally rectangular shaped cavity for retaining a volume of animal litter within the cavity, said main base member including a peripheral edge which lies in a generally horizontal plane,
   a canopy member, said canopy member having a plurality of canopy member sidewalls and a top portion which define a cavity, said canopy member being functionally adapted to overlay a portion of the cavity defined within said main base member,
   a removable screen member, said screen member dividing the main base into two parts and being situated in a generally vertical plane that is perpendicular to the plane defined by the peripheral edge of said base member and further being functionally adapted to sift said animal litter when the litter box is tilted, and
   a screen cover holding bar disposed between opposing base member sidewalls, said screen cover holding bar preventing litter that is deposited atop the screen from passing over the screen cover holding bar and said screen cover holding bar retaining said screen member in a vertical plane.

9. The litter box of claim 8 wherein said main base member sidewalls are integrally formed with said bottom portion of a single piece of material.

10. The litter box of claim 9 wherein said canopy member sidewalls are integrally formed with said top portion of a single piece of material.

11. The litter box of claim 10 wherein said main base member and said canopy member are sealingly engaged so as to prevent the passage of animal litter therebetween.

12. The litter box of claim 11 wherein a portion of said main base member, said canopy member and said screen member form a second litter box cavity therewithin.

13. An animal litter box that facilitates the removal of animal excrement and clumped, soiled animal litter from clean animal litter which comprises
   a main base member, said main base member having a plurality of side walls and a bottom surface forming a generally horizontally oriented rectangular cavity, said cavity being adapted for holding a volume of animal litter therewithin,
   a canopy member that is functionally adapted to sealingly overlay a portion of said main base member and a portion of said base member cavity, said base member and said canopy member forming a generally L-shaped litter box cavity therebetween,
   a vertically oriented screen member dividing said main base member cavity into two adjacent cavity areas and substantially covering that portion of the L-shaped litter box cavity that is formed by the canopy member and the main base member, said screen member having a number of apertures defined within it, such apertures being large enough to permit passage of clean animal litter therethrough but small enough to prevent passage of animal excrement and clumped, soiled animal litter therethrough when the litter box is tilted, and a screen holding bar extending generally horizontally across the base member cavity immediately adjacent said screen member whereby animal excrement and clumped, soiled animal litter is contained atop said screen member and to one side of said screen holding bar when the litter box is tilted for removal therefrom.

14. The litter box of claim 13 wherein the sidewalls and the bottom surface of said main base member are formed of a single piece of material and wherein the sidewall and top surface of said canopy member are formed of a single piece of material.

15. The litter box of claim 14 including a screen access door, said screen access door being manually movable between a fully opened and a fully closed position relative to and immediately adjacent the screen member such that sifting of animal litter is prevented when the screen access door is in its fully closed position.

* * * * *